INVENTOR.
ROBERT C. RUSSELL

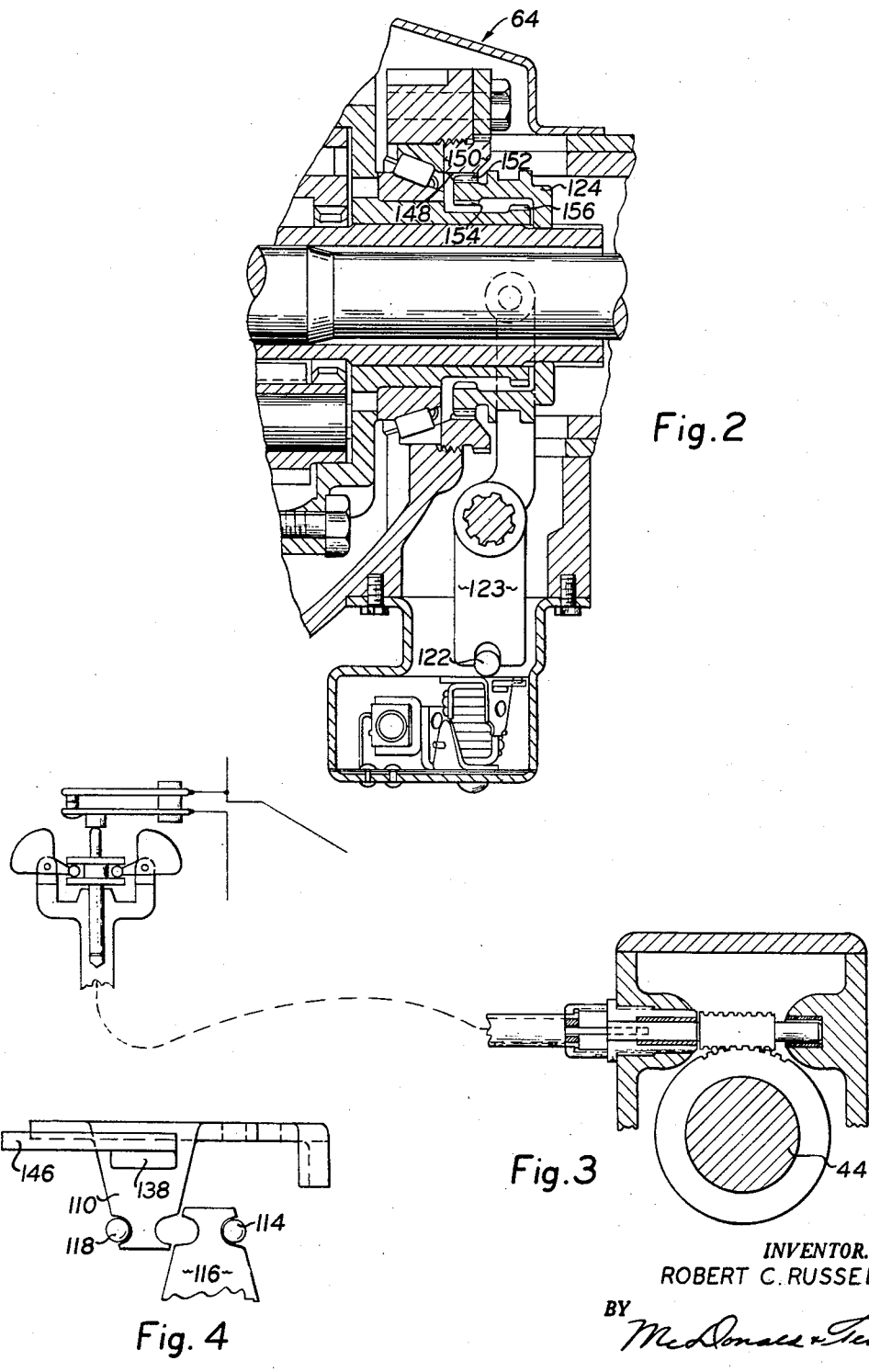

BY

*McDonald & Teagno*

ATTORNEYS

United States Patent Office 2,934,186
Patented Apr. 26, 1960

2,934,186

SYNCHRONIZING MEANS FOR MULTIPLE SPEED RATIO AXLE SHIFTING MECHANISM

Robert C. Russell, Shaker Heights, Ohio, assignor to Eaton Manufacturing Company, Cleveland, Ohio, a corporation of Ohio Application August 13, 1956, Serial No. 603,678

28 Claims. (Cl. 192—4)

The present invention is a continuation in part of U.S. patent application #576,168 filed April 4, 1956 and relates to a device for facilitating the shift from one speed ratio to another in a two-speed axle for a vehicle. Two-speed axle devices up to the present time have been generally limited to devices wherein the speed ratio difference between the low and the high speed ratios has been relatively small and consequently, the problem of shifting from one speed ratio to another has not been particularly great. With the axles which have been used heretofore, the full capabilities of a two-speed axle have not been realized because when such an axle was combined with a conventional multiple speed transmission, many of the speed ratios which were obtained were practically useless since there was such a slight variation from some of the other speed ratios. In order to take full advantage of a multiple speed ratio axle means, a wide speed ratio range axle means is most effective because with such an axle, the transmission can be shifted throughout the range of speed ratios before a shift is effected in the axle. Such an arrangement also greatly reduces the number of axle shifts which are required for optimum operation. In addition, since a greater portion of the torque multiplication of the overall system is being accomplished by the axle means, a smaller and lighter transmission can be utilized.

A wide speed ratio axle means, while possessing the advantages heretofore mentioned, also presents certain difficulties in shifting from one speed ratio to another. In a planetary type two-speed axle means, one of the elements of the planetary unit is fixed from rotation, while another element is rotated by the input means to effect rotation of the remaining element of the planetary unit at reduced speed ratio. When it is desired to lock up this planetary unit, the element which was fixed from rotation during low speed ratio drive is constrained to rotate with the input element by effecting a shift of a suitable clutch means. In order to retain the advantage which has been gained by using a multiple speed axle, it is necessary that the shift from low speed ratio to high speed ratio be effected as rapidly as possible, but during drive in the low speed ratio, the angular velocity differential between the elements which are to be locked up for the high speed ratio is very great. When the shift to high speed ratio is attempted, this velocity differential must be brought to approximately "zero" because the elements must be rotating synchronously before the clutch means can be engaged to lock these two elements together. If normal deceleration of the input element is relied upon, the time lag between the shift from low speed ratio to high speed ratio would be prohibitive. The invention disclosed herein is directed to means to obviate this difficulty and to enable a shift from low speed ratio to high speed ratio to be effected with practically no time lag.

Broadly, this invention relates to a braking means on the propeller shaft to retard the speed of the propeller shaft which is energized after the two-speed axle is disengaged from the low speed ratio during the shift to the high speed ratio. This brake is controlled by a speed responsive governor means which allows the brake to be energized only during certain speed ranges of the propeller shaft. In addition, a holding solenoid is provided which positively prevents a shift attempt into the high speed ratio during asynchronous rotation of the elements which are to be clutched together for conjoint rotation.

An object of this invention is to provide means to effect the rapid shifting of multiple speed ratio axle means.

A further object is to prevent shifting of the axle means during asynchronous rotation of the elements to be locked together. These and other objects and advantages will become more apparent from the following detailed description of the device and from the accompanying drawings wherein:

Figure 2 illustrates the shifting linkage in assembly with the shiftable sleeve portion of the rear axle.

Figure 3 shows the driving means for the speed responsive governor control means.

Figure 4 is a top view showing a portion of the switch structure in the control circuit for the synchronizing means.

Figures 5, 6, 7, and 8 illustrate the shifting means during different stages of operation.

Briefly, this device operates in the following manner. When it is desired to shift the axle from the low speed ratio to the high speed ratio, the propeller shaft must be reduced in speed very rapidly in order to effect synchronization of the planetary elements which are to be locked together for drive in the high speed ratio. To obtain this result, the manual preselection switch in the cab of the vehicle is preselected to an axle high speed ratio position which results in energization of an electric shifting motor for the axle and consequent shifting of a bell-crank which is connected to a clutch actuating means by a torsion spring. Also, when the preselection switch is moved to a high speed ratio position, a circuit is closed which energizes a solenoid having a plunger which is positioned to prevent further movement of the clutch shifting means toward the high speed ratio position. At this stage, therefore, the shifting means is loaded with a force being exerted on the clutch shifting means. At this time, the operator instantaneously releases the load on the axle by closing the throttle which removes the load on the clutch teeth between the reaction element and planetary element being held thereby and allows the clutch element to shift to a neutral position wherein the axle is in a non-driving or free-wheeling position. When the clutch shifting means moves to an intermediate position, a switch means is closed which energizes a magnetic brake acting on the propeller shaft which reduces the speed of the propeller shaft. When the speed of the propeller shaft has been sufficiently reduced, a speed control governor means opens the control circuit which results in deenergization of the propeller shaft brake and deenergization of the holding solenoid. At this time, the clutch shifting means is free to move into the high speed ratio position.

Figure 1:
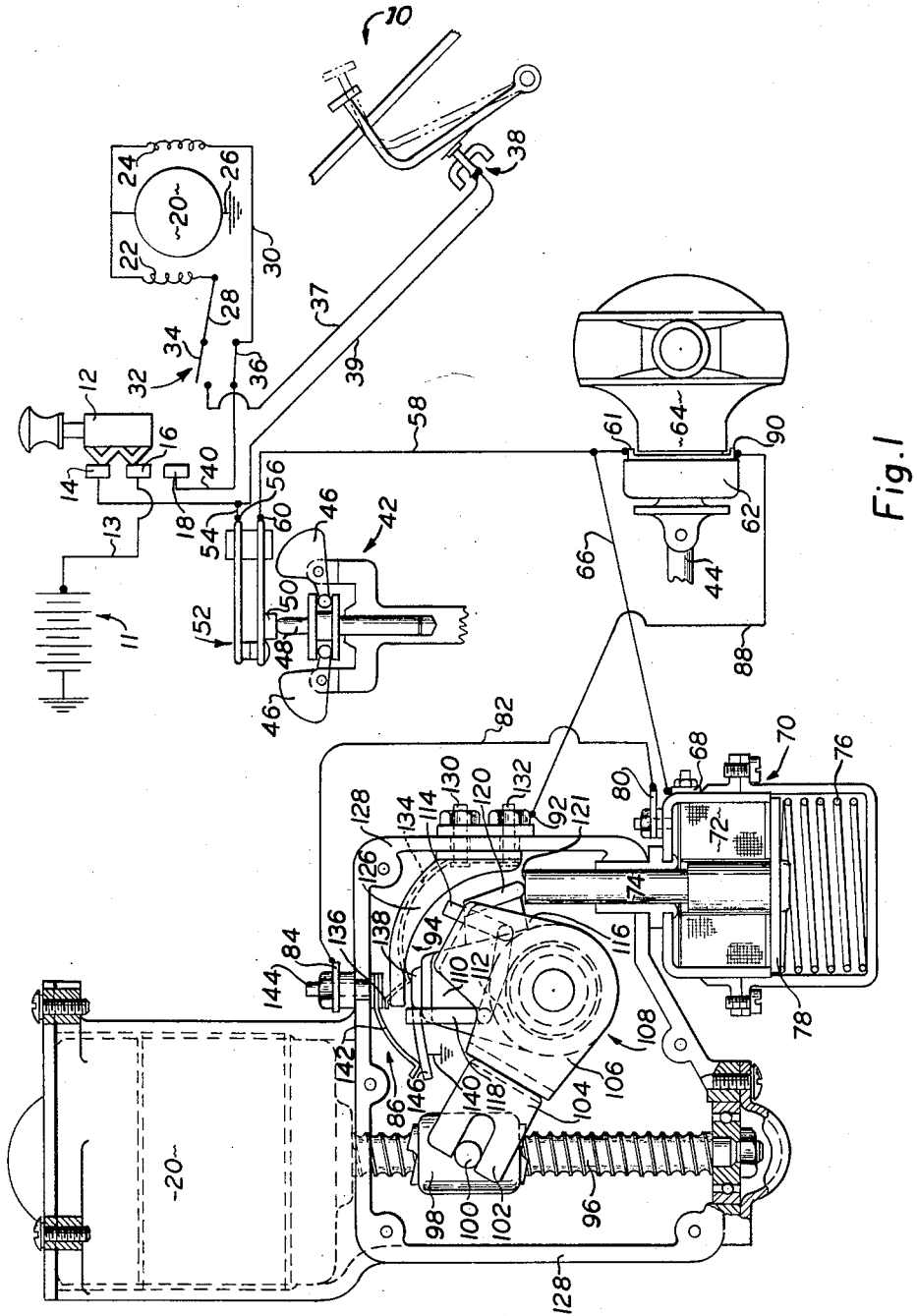
Figure 1 is a diagrammatic illustration of the novel synchronizing means.

Referring to the drawing for a more detailed description of the device, Figure 1 illustrates an axle and control assembly 10. A shift control switch 12 is movable from either a high speed ratio axle position or a low speed ratio axle position. As shown in Figure 1, the switch is in the high position in contact with the contacts 14 and 16. When the control switch is moved to the lower position so that the circuit is closed between contacts 16 and 18, the axle is preselected to a low speed ratio position. A reversible electric shift motor 20 having field windings 22 and 24 is connected to and drives an axle shifting mechanism which will be described in due course. A conductor 26 connects the motor to a ground connection and conductors 28 and 30 connect the field windings 22 and 24 to opposite terminals of a switch 32 having contacts 34 and 36. Conductor 37 is connected to terminal 34 of switch 32 at one end and to one contact of switch 38 at the other end, and conductor 39 is connected to the other contact of switch 38 and to contact 14 of switch 12. Conductor 40 connects terminal 36 of switch 32 to contact 18 of switch 12. Switch 38 is actuated to a circuit closed position by depressing the clutch pedal. In the preferred embodiment, the clutch controlled switch is not used, but if so desired, the clutch controlled switch can be utilized.

A speed responsive governor control means 42 is driven by a vehicle propeller shaft 44 shown in Figures 1 and 3. When the propeller shaft falls below a predetermined speed, the weights 46 move inwardly which moves an actuating rod 48 away from a block 50 of switch 52. A conductor 54 connects conductor 39 with an upper terminal 56 of switch 52 and a conductor 58 connects a lower terminal 60 to a terminal 61 of magnetic brake 62 arranged on axle housing 64. Conductor 66 connects conductor 58 to the terminal 68 of a holding solenoid 70. This solenoid is comprised of a coil 72 and a plunger 74 which is urged in an upward position as viewed in Figure 1 by a compression spring 76 through the plate 78 attached to plunger 74. Terminal 80 of the solenoid has connected thereto a conductor 82 which is connected to a terminal 84 of a switch 86. A conductor 88 connects a terminal 90 of magnetic brake 62 to a terminal 92 of a switch 94.

The motor 20 drives a screw 96 which has a nut 98 rotatably threaded thereon which is moved longitudinally when the screw member is rotated and the longitudinal direction is determined by the direction of rotation of the screw member. The longitudinal position of the nut 98 controls the opening and closing of the terminals 34 and 36 of limits switch 32. When the nut is in the position as shown in Figure 1, the terminal 34 of the limit switch 32 is opened by the nut 98 and when the nut 98 is in the other extreme position, the terminal 34 is closed and the terminal 36 is opened. The nut 98 has connected thereto a radially directed pin 100 which is received between projecting finger portions 102 of a yoke 104 which is fixedly attached to an arm 106 of a bell-crank 108.

A lever 110 is controllably connected to bell-crank 108 by a torsion spring 112 which has an up-turned end 114 attached to an arm portion 116 of bell-crank 108 and end 118 of the spring 112 is suitably attached to the lever 110. This arrangement provides a resilient connection between bell-crank 108 and lever 110 so that when bell-crank 108 is rotated a given amount, the lever 110 will also rotate, provided there is not too much resistance to movement of the lever 110, in which case the connection will yield. Formed integrally on the lever 110 is a lateral arm 119 having an end portion 120 which is engageable with an end surface 121 of the plunger 74.

Attached to the lever 110 is a connection 122 of the swivel barrel type, shown in Figure 2, with the lever 123 adapted to be oscillated between two extreme positions for shifting a sleeve 124 of the two-speed axle 64.

The switch 94 is comprised of a mounting arm 126 attached to the housing 128 by bolt means 130 and 132. A resilient switch spring arm 134 is also mounted on the bolts 130 and 132 and is resiliently biased downwardly as viewed in Figure 1. The resilient switch spring arm 134 is suitably connected to terminal 92 and is insulated from the housing 128. The downward movement of the switch spring arm 134 is limited by a tab portion 136 formed on the spring arm and abutting a top surface of the mounting arm 126. A contact 138 of switch 94 is mounted on the lever 110 in the same plane with the switch spring arm 134 and conductor 140 connects the switch 94 to ground.

The switch 86 is comprised of a spring arm 142 mounted on the housing 128 so as to be insulated from the housing and is connected to the terminal 84 by a suitable bolt means 144. A contact 146 of switch 86 is also mounted on the lever 110 and lies in the same plane as the spring arm 142. The conductor 140 also serves as a ground connection for the switch 86.

Referring to Figure 2, the low speed ratio clutch teeth 148 are formed on a low speed reaction plate 150 which is fixed from rotation in the housing. Clutch teeth 152 are formed externally on the shiftable member 124 to be selectively engageable with the clutch teeth 148. A row of internal teeth 154 are formed on the shiftable member 124 and are adapted to be selectively engaged with teeth 156 formed on an element of the planetary unit of the axle.

Figure 5:
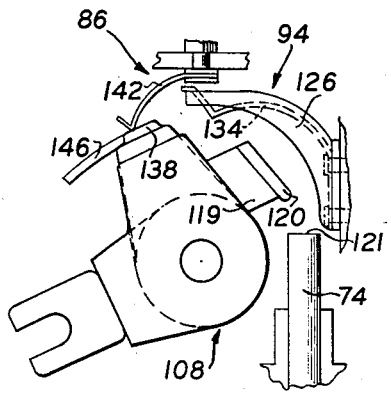
Figure 6:
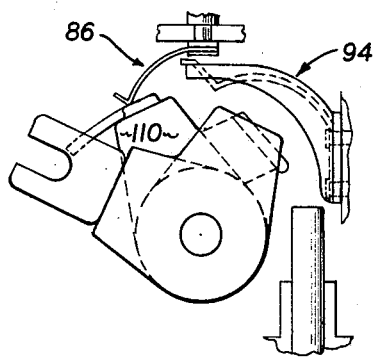

In order to more fully understand the details of this device, a typical operating cycle is set forth as follows:

When the vehicle is being operated in the low speed ratio of the axle, the nut 98 is in the lower-most position (as viewed in Figure 1) and the bell-crank 108 is in the extreme counterclockwise position. Figure 5 shows the shift control means during this operating condition. When it is desired to shift the axle from the low speed ratio to the high speed ratio, the control switch 12 is moved to the position shown in Figure 1 wherein the circuit is closed across contacts 14 and 16. At this time, the propeller shaft is rotating at a great enough speed to maintain the switch 52 in a closed position by virtue of the speed control governor means 42. Also, the switch 86 is closed as shown in Figure 5. Tracing the circuit under this operating condition, the circuit comprising the electrical source 11, contacts 14 and 16 of switch 12, conductor 54, switch 52, conductors 58 and 66, terminal 68, coil 72, terminal 80, conductor 82, terminal 84, switch 86, and ground 140 is closed and therefore provides energization of the solenoid 70. Simultaneously, the motor 20 is energized by source 11 through conductor 13, contacts 14 and 16 of switch 12, conductor 38, terminal 34 of switch 32, conductor 28, field winding 22 and ground 26, which results in rotation of screw 96 in a direction to move the nut 98 upwardly, as viewed in Figure 1, to the position shown in Figure 6 and consequently, energizes the torsion spring 112 which biases the lever 110 in a clockwise direction. Lever 110 and lateral arm 119 remain in the position indicated in Figure 5 because of the reaction torque between the teeth 148 and 152 as shown in Figure 2.

Figure 7:
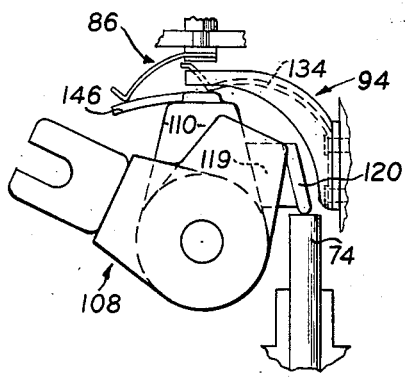
Figure 8:
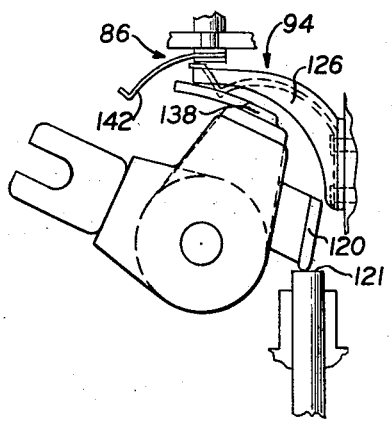

When the torque is momentarily interrupted by closing the throttle or depressing the clutch pedal, the shiftable element 124 is urged to a neutral position due to the bias of torsion spring 112 acting on the lever 110 disengaging teeth 152 from teeth 148 by movement of the lever 110 to the position shown in Figure 7. The lever 110 and lateral arm 119 cannot move further in a clockwise direction due to the abutment of portion 120 against the end surface 121 of the energized solenoid plunger 74. When the lever 110 is moved to the neutral position, as viewed in Figure 7, switch 94 is closed which results in energization of the propeller shaft brake 62 through a circuit comprised of the conductor 58, terminal 61, brake 62, terminal 90, conductor 88, terminal 92, resilient switch spring arm 134, contact 138, and the common ground 140. At this time, the solenoid is energized preventing further movement of the shiftable member 124 toward a high speed ratio position and the propeller shaft brake is engaged to retard the speed of the propeller shaft and effect synchronization of the clutch teeth 154 and 156.

When the speed of the propeller shaft is reduced sufficiently by the action of the brake 62, the speed responsive governor control means 42 opens the switch 52 which opens the circuit to the brake 62 and the holding solenoid 70. The lever 110 and lateral arm 119 immediately move in a clockwise direction to the position viewed in Figure 8, which effects engagement of the clutch teeth 154 and 156 and completes the shift.

Whenever it is necessary to shift to low speed ratio from high speed ratio, the propeller shaft is necessarily decreased in speed to a point where the switch 52 has been opened due to the action of the speed responsive means 42. When it is desired to effect the shift to low speed ratio, control switch 12 is moved to a position wherein the circuit is closed across contacts 16 and 18 which results in energization of field winding 24 of motor 20 and movement of the shifting linkage such that bellcrank 108 is rotated in a counterclockwise direction and lever 110 is biased for movement in the same direction.

When torque is momentarily interrupted by closing the throttle or depressing the clutch pedal, biased lever 110 moves in a counterclockwise direction to a neutral position and the shaft is completed when the engine speed is then increased to a speed at which the parts to be clutched together are rotating synchronously. Closing of the switches 86 and 94 by movement of the lever 110 does not energize the circuit because switch 52 is open. Therefore, due to the inherent action of speed responsive means 42 and switch 52, no difficulty is encountered in the switching mechanisms 86 and 94 during the shift from high speed ratio to low speed ratio.

It is obvious from the above description that the axle cannot shift from the low speed ratio to the high speed ratio until the members to be clutched together are rotating synchronously, which insures a smooth, quiet, and rapid shift. With the arrangement of the holding solenoid, the clutch teeth which are to be engaged are prevented from rattling or prematurely engaging before synchronous rotation, which results in practically no wear on the teeth due to the engagement of the elements. The propeller shaft brake reduces the speed of the propeller shaft to the speed of the element with which it is to be synchronized in less than one second, and therefore makes it possible to shift the axle in a shorter period of time than is consumed in effecting the shift of the transmission.

While the present invention has been described in connection with certain specific embodiments, it is to be understood that the foregoing description is merely exemplary and that the concept of this invention is susceptible of numerous other modifications, variations, and applications which will be apparent to persons skilled in the art. The invention is to be limited, therefore, only by the broad scope of the appended claims.

What I claim is:

1. In a vehicle having a multiple speed ratio transmission, a propeller shaft connected thereto, a multiple speed ratio axle means connected to said propeller shaft and having at least a high and a low speed ratio, braking means interposed between said transmission and said axle, means operative to energize said braking means and said braking means being operative to retard the speed of said propeller shaft when said axle is shifted from said low speed ratio to said high speed ratio, and speed responsive means operatively connected to and releasing said braking means when said propeller shaft reaches a predetermined retarded speed.

2. In a vehicle, a multiple speed ratio axle means, shifting means operable to shift said axle means to a low speed ratio or a high speed ratio, input means to said axle means, retarding means to retard the speed of said input means when said axle means is shifted from said low speed ratio to said high speed ratio, means operative to energize said retarding means, and speed responsive means operatively connected to and releasing said retarding means when said input means reaches a predetermined retarded speed.

3. In a vehicle, a multi-speed ratio transmission, a multi-speed ratio axle means, means to shift said axle means to a low speed ratio or a high speed ratio, a propeller shaft connecting said transmission to said axle means, braking means operable to reduce the speed of said propeller shaft when said axle means is in an intermediate condition during the shift of said axle means from said low speed ratio to said high speed ratio, means operative to energize said braking means, and speed responsive means operatively connected to and releasing said braking means when said propeller shaft speed is reduced to a predetermined speed.

4. In a vehicle, a multiple speed ratio axle means, input means operable to drive said axle means, control means to select a given axle speed ratio, braking means controlled by a control circuit and operable to retard the speed of said input means, switch means operable to close said control circuit and energize said brake when said axle control means is moved to select a higher axle speed ratio, and speed responsive means operatively connected to and releasing said braking means when said input means reaches a predetermined retarded speed.

5. Control means for a propeller shaft braking means comprising a propeller shaft, an electrically operable braking means to selectively brake said propeller shaft, a multiple speed ratio axle means drivingly connected to said propeller shaft, said axle means having at least a high speed ratio and a low speed ratio, shifting means operable to shift said axle means to either of said speed ratios, circuit means to control said shifting means comprising an axle shift control switch, circuit energizing means, a second switch connected by conductor means to said first switch, a third switch controlled by speed responsive means and being in a closed circuit position when said propeller shaft is rotated above a predetermined speed, said second switch being in an open circuit position when said axle means is operating in said low speed ratio and said second switch being moved to a circuit energizing position when said axle means is shifted from said low speed ratio to a neutral position to thereby energize said braking means, and said third switch being moved from a circuit energizing position to an open position when said propeller shaft speed is reduced below a predetermined speed by said braking means.

6. In a vehicle, a multiple speed ratio axle means, braking means operable to synchronize relatively rotatable elements in said axle means when said axle means is shifted from a low speed ratio to a high speed ratio, shifting means operable to shift said axle means to said high speed ratio or to said low speed ratio, control means operated by said shifting means to energize said braking means to retard the speed of one of said elements when said axle means is shifted from said low speed ratio to said high speed ratio and speed responsive means responsive to the speed of one of said elements to deenergize said braking means when one of said elements is reduced below a predetermined speed by said braking means.

7. In a vehicle, a multiple speed ratio axle means, input means to said axle means, braking means to retard said input means when said axle means is shifted from a relatively low speed ratio to a relatively high speed ratio, means operative to energize said braking means, and speed responsive means operatively connected to and releasing said braking means when said input means speed is reduced below a predetermined speed by said braking means.

8. In a vehicle, an axle shift synchronizing means comprising a multiple speed ratio axle means, an input means to said axle means, braking means operable to selectively brake said input means, a motor means, shifting means operated by said motor means to selectively shift said axle to either a high speed ratio or a low speed ratio, means operated by said shifting means to energize said braking means when said axle means is shifted from said low speed ratio to said high speed ratio, and means operable to deenergize said braking means when said input means is reduced below a predetermined speed by said braking means.

9. In a vehicle, a multiple speed ratio axle means, input means to said axle means, means to selectively shift said axle means to either a high speed ratio or a low speed ratio comprising a motor means, threaded means rotatably driven by said motor means, nut means threadingly engageable with said threaded means and operable to selectively, longitudinally move a linkage means operably engageable with said nut means, switch means operably engageable with said linkage means, braking means being energized to brake said input means when said axle means is shifted from said low speed ratio to an intermediate position, and means responsive to the speed of said input means to deenergize said braking means when said input means is braked below a predetermined speed by said braking means.

10. A device according to claim 9 wherein said braking means comprises an energizable coil fixed to a housing of said axle means and a rotatable braking element connected to said input means whereby said rotatable element and said input means are rotatably retarded when said coil is energized.

11. In a vehicle, a multiple speed ratio axle means, means to selectively shift said axle means to a high speed ratio or a low speed ratio comprising a power means, a first movable linkage means driven by said power means, a second movable linkage means operable to shift said axle means to said high speed ratio or to said low speed ratio, resilient means interposed between said first linkage means and said second linkage means whereby said first linkage means is movable to a preselected position and biases said second linkage means for movement, a first switch means operable by said second linkage means, a second switch means being selectively energizable responsive to the speed of said input means, braking means energizable to brake said input means when said axle means is shifted from said low speed ratio to said high speed ratio, and said second switch being operable to deenergize said braking means when said input means is reduced below a predetermined speed by said braking means.

12. In a vehicle, a multiple speed ratio axle means having at least a low speed ratio and a high speed ratio, input means to said axle means, reaction means in said axle means to effect said low speed ratio, clutching means in said axle means to effect said high speed ratio, shifting means in said axle means to alternately engage said reaction means or said clutching means, speed responsive means, and means operated by said shifting means and controlled by said speed responsive means to prevent premature engagement of said clutching means when said axle means is shifted from said low speed ratio to said high speed ratio.

13. In a vehicle, a multiple speed ratio axle means, input means to said axle means, shifting means operable to shift said axle means to a relatively low speed ratio or a relatively high speed ratio, braking means operable to retard the speed of said input means when said axle means is shifted from said low speed ratio to said high speed ratio, means to release said braking means when said input means reaches a predetermined retarded speed and means to prevent premature shifting of said axle means to said high speed ratio before said input means reaches said predetermined retarded speed.

14. In a vehicle, a multi-speed ratio axle means, input means to said axle means, means to shift said axle means to at least a low speed ratio or a high speed ratio, braking means operable to reduce the speed of said input means while said axle means is in an intermediate position during the shift of said axle means from said low speed ratio to said high speed ratio, means to release said braking means when said input means is reduced to a predetermined speed and means to prevent premature shifting of said axle means to said high speed ratio before said input means is reduced to said predetermined speed.

15. In a vehicle, a multiple speed ratio axle means, input means operable to drive said axle means, control means to select a given axle speed ratio, brake means controlled by control circuit means and operable to retard said input means, switch means to close said control circuit and energize said brake when said axle control means moves to select a relatively high axle speed ratio, means operable to release said braking means when said input means reaches a predetermined retarded speed, and means to prevent premature engagement of said axle means in said higher axle speed ratio before said input means reaches said predetermined retarded speed.

16. A device according to claim 5, wherein said means to prevent premature engagement of said axle means comprises an energizable solenoid means.

17. In a vehicle, a multiple speed ratio axle means, braking means to synchronize relatively rotatable elements in said axle means when said axle means is shifted from a relatively low speed ratio to a relatively high speed ratio, shifting means operable to shift said axle means to said high speed ratio or to said low speed ratio, control means operated by said shifting means to energize said braking means when said axle means is shifted from said low speed ratio to said high speed ratio, speed responsive means responsive to the speed of one of said elements to deenergize said braking means when one of said elements is reduced below a predetermined speed by said braking means, and holding means to prevent premature shifting of said shifting means to said high speed ratio before said braking means reduces said one element below said predetermined speed.

18. In a vehicle, a multiple speed ratio axle means, input means to said axle means, braking means to retard said input means when said axle means is shifted from a relatively low speed ratio to a relatively high speed ratio, holding means to prevent premature shifting of said axle means to said high speed ratio, and means to release said braking means and said holding means when said input means is reduced below a predetermined speed by said braking means.

19. In a vehicle, an axle shift synchronizing means comprising a multiple speed ratio axle means, input means to said axle means, braking means operable to selectively brake said input means, a motor means, shifting means operated by said motor means to selectively shift said axle means to either a high speed ratio or a low speed ratio, means operated by said shifting means to energize said braking means when said axle means is shifted from said low speed ratio to said high speed ratio, holding means to prevent premature engagement of said axle means in high speed ratio, and means operable to deenergize said braking means and said holding means when said input means is retarded below a predetermined speed by said braking means.

20. In a vehicle, a multiple speed ratio axle means, input means to said axle means, means to selectively shift said axle means to either a high speed ratio or a low speed ratio comprising a motor means, threaded means rotatably driven by said motor means, nut means threadingly engageable with said threaded means, linkage means operably engageable with said nut means, switch means operably engageable with said linkage means, braking means energizable to brake said input means when said axle means is shifted from said low speed ratio to said high speed ratio, energizable holding means operable to prevent premature engagement of said axle means in said high speed ratio, and means responsive to the speed of said input means to deenergize said braking means and said holding means when said input means is braked below a predetermined speed by said braking means.

21. In a vehicle, a multiple speed ratio axle means, means to selectively shift said axle means to a high speed ratio or a low speed ratio comprising a power means, a first movable linkage means driven by said power means, a second movable linkage means operable to shift said axle means to said high speed ratio or said low speed ratio, resilient means interposed between said first and second linkage means whereby said first linkage means is movable to a preselected position and biases said second linkage means for movement, a first switch means operable by said second linkage means, speed responsive means responsive to the speed of said input means, a second switch means actuated by said speed responsive means, holding means to prevent premature engagement of said axle means in said high speed ratio, braking means energizable to brake said input means when said axle means is shifted from said low speed ratio to said high speed ratio and said second switch being operable to deenergize said braking means and said holding means when said input means is reduced below a predetermined speed by said braking means.

22. In a vehicle, a multiple speed ratio axle means having at least a low speed ratio and a high speed ratio, input means to said axle means, reaction means in said axle means to effect said low speed ratio, clutching means in said axle means to effect said high speed ratio, braking means operable to selectively brake said input means, shifting means in said axle means to alternately engage said reaction means or said clutching means, holding means to prevent premature engagement of said clutching means and means operated by said shifting means controlled by speed responsive means to disengage said holding means and said braking means when said axle means is reduced in speed by said braking means below a predetermined speed.

23. In a vehicle, an axle shift synchronizing means comprising a multiple speed ratio axle means, an input means to said axle means, a motor means, shifting means operated by said motor means to selectively shift said axle means to either a high speed ratio or a low speed ratio, holding means to prevent premature shifting of said axle means to said high speed ratio, and means to release said holding means when said input means is reduced below a predetermined speed.

24. In a vehicle, a multiple speed ratio axle means, input means to said axle means, means to selectively shift said axle means to either a high speed ratio or a low speed ratio comprising a motor means, threaded means rotatably driven by said motor means, nut means threadingly engageable with said threaded means, linkage means operably engageable with said nut means, switch means operably engageable with said linkage means to prevent premature shifting of said axle means to said high speed ratio, and speed responsive means responsive to the speed of said input means to release said holding means when said input means falls below a predetermined speed.

25. Control means for propeller shaft braking means comprising a propeller shaft, an electrically operable braking means to selectively brake said propeller shaft, a multiple speed ratio axle means drivingly connected to said propeller shaft, said axle means having at least a high speed ratio and a low speed ratio, shifting means operable to shift said axle means to either of said speed ratios, circuit means to control said shifting means comprising an axle shift control switch, circuit energizing means, a second switch connected by conductor means to said first control switch, speed responsive means, a third switch controlled by said speed responsive means and being in open circuit position when said propeller shaft is rotated above a predetermined speed, holding means connected by conductor means to said third switch, a fourth switch connected by conductor means to said holding means, said fourth switch being in a circuit closed position when said shifting means is in a low speed ratio position or a neutral position, said second switch means being in open circuit position when said axle means is operating in said low speed ratio, said second switch being moved to a closed position when said axle means is shifted from said low speed ratio to a neutral position and thereby energizing said braking means, said third switch being moved from a circuit energizing position to an open position when said propeller shaft is reduced below a predetermined speed by said braking means whereby said braking means and said holding means are deenergized.

26. In a vehicle, a multiple speed ratio axle means having at least a low speed ratio and a high speed ratio, relatively rotatable elements in said axle means to be synchronized when said axle means is shifted from said low speed ratio to said high speed ratio, shifting means operable to shift said axle means to said low speed ratio or to said high speed ratio, holding means operable to prevent said shift to said high speed ratio before said relatively rotatable elements are substantially synchronized, control means operated by said shifting means to energize said holding means when said axle means is shifted from said low speed ratio to said high speed ratio, and speed responsive means responsive to the speed to one of said elements to deenergize said holding means when said elements are rotating substantially synchronously.

27. In a vehicle, an axle shift synchronizing means comprising a multiple speed ratio axle means, an input means to said axle means, a motor means, shifting means operated by said motor means to selectively shift said axle to either a high speed ratio or a low speed ratio, a holding means operable to prevent said axle from shifting into said high speed ratio, means operated by said shifting means to energize said holding means when said axle means is shifted from said low speed ratio to an intermediate position and means operable to deenergize said holding means when said input means falls below a predeterminad speed.

28. In a vehicle, multi-speed ratio axle means, input means to said axle means, means to shift said axle means to at least a low speed ratio or a high speed ratio, holding means operable to prevent said axle from shifting to said high speed ratio, means to energize said holding means when said axle means is shifted to an intermediate position during said shift from said low speed ratio and means to release said holding means when said input means falls below a predetermined speed.

References Cited in the file of this patent

UNITED STATES PATENTS

| | | |
|---|---|---|
| 2,402,343 | Price | June 18, 1946 |
| 2,613,773 | Gilfillan | Oct. 14, 1952 |
| 2,653,690 | Saracchi | Sept. 29, 1953 |